United States Patent [19]

Wilson

[11] 4,034,267
[45] July 5, 1977

[54] INDICATING APPARATUS

[75] Inventor: John T. Wilson, Beaver, Pa.

[73] Assignee: Westinghouse Electric Corporation, Pittsburgh, Pa.

[22] Filed: Dec. 12, 1975

[21] Appl. No.: 640,301

[52] U.S. Cl. .................................. 361/44; 361/87
[51] Int. Cl.² ........................................ H02H 3/28
[58] Field of Search .......... 317/18 D, 18 R, 36 TD, 317/27 R, 28 B, 29 B

[56] References Cited

UNITED STATES PATENTS

| | | | |
|---|---|---|---|
| 2,307,500 | 1/1943 | Geise | 317/28 B |
| 3,213,321 | 10/1965 | Dalziel | 317/18 D |
| 3,273,017 | 9/1966 | Mathews | 317/28 R X |
| 3,434,011 | 3/1969 | Zocholl | 317/36 TD X |
| 3,683,923 | 8/1972 | Anderson | 317/18 D X |
| 3,737,726 | 6/1973 | Tarchalski | 317/18 D |
| 3,739,229 | 6/1973 | Moran | 317/36 TD X |
| 3,786,311 | 1/1974 | Hobson, Jr. et al. | 317/18 D |
| 3,818,275 | 6/1974 | Shimp | 317/36 TD X |
| 3,899,717 | 8/1975 | Legatti et al. | 317/18 D |
| 3,959,695 | 5/1976 | Shimp | 317/36 TD X |

Primary Examiner—J D Miller
Assistant Examiner—Patrick R. Salce
Attorney, Agent, or Firm—M. S. Yatsko

[57] ABSTRACT

Self-powered apparatus for indicating the existence of a fault in any of a plurality of conductors in an multi-conductor electrical distribution system. The plurality of conductors pass through the window of a closed loop core structure current transformer, and the current transformer has a power output and a signal output. The power output is connected to, and drives, fault indicating means and starting means. The starting means initiate operation of control signal translation means which are connected to the current transformer signal output. Also included are transmission means connected to the control signal translation means and to prevention means incorporated within the indicating means, and the transmission means transmit the control signal from the signal translation means to the prevention means. The indicating means are responsive to operation of the prevention means, such that only when the control signal is transmitted to the prevention means will the indicating means be allowed to operate. The entire apparatus is powered only during the existence of a fault, and derives its power by the fault's causing current to flow within the current transformer. The apparatus may also be utilized in a current-monitoring function for a single conductor.

17 Claims, 5 Drawing Figures

INDICATING APPARATUS

BACKGROUND OF THE INVENTION

This invention relates generally to electrical distribution apparatus, and more particularly to apparatus for indicating the existence of a fault in any of a plurality of conductors in a multi-conductor electrical distribution system.

Fault indicating apparatus, and more particularly ground fault sensing and protection devices, have generally comprised current transformers inserted into each conductor in a multi-conductor distribution system, and which were connected to associated means which obtained unidirectional output current varying with the ground current in the system being protected. The associated means compare the unidirectional current signal with a predetermined signal level, and whenever the unidirectional current signal exceeded the predetermined signal level, the apparatus would indicate the existence of a ground fault, most notably by causing a circuit breaker to trip. U.S. Pat. Nos. 3,660,722 and 3,697,810 illustrates a typical example of this type of fault indicating apparatus.

Other types of fault indicating apparatus utilize sensing means electrically coupled to the conductors to be protected, and contain independent power sources for powering the fault indicating apparatus. A problem associated with both types of priority devices is that they are continuously operative. Extraneous signals or interactions between the current transformers may produce a fault indication when none is present. In these instances, the indicating and protective means may become operational when in reality a fault does not exist.

SUMMARY OF THE INVENTION

The above mentioned problem of the prior art is eliminated by this invention by providing a self-powered fault indicating apparatus which derives its power only from the existance of a fault. The apparatus comprises a closed loop core structure current transformer having a power output and a control output, with the closed loop core structure forming a window therebetween through which a plurality of electrical conductors extend. Control signal translation means are connected to the transformer control output, and starting means for initiating operation of the translation means are connected to both the translation means and to the power output. The starting means initiate operation of the control signal translation means only when the power output reaches a predetermined power level. The translation means transform the control output into a control signal, which is transmitted through transmission means to fault indicating means, and more particularly to prevention means for preventing the operation of the fault indicating means. The fault indicating means are driven by, and connected to, the power output of the current transformer, and the prevention means are responsive to the control signal such that the prevention means allow the operation of the fault indicating means only when the control signal activates the prevention means. The power output and the control output are operable only during the existence of a fault condition, because the conductors extending through the window of the current transformer cause a current flow in the transformer only when a fault exists in at least one of the conductors. The apparatus may also be utilized in a current-monitoring function for a single conductor.

BRIEF DESCRIPTION OF THE DRAWINGS

Reference is now made to the description of the preferred embodiment, illustrated in the accompanying drawing, in which.

DESCRIPTION OF THE PREFERRED EMBODIMENT

Figure 1:
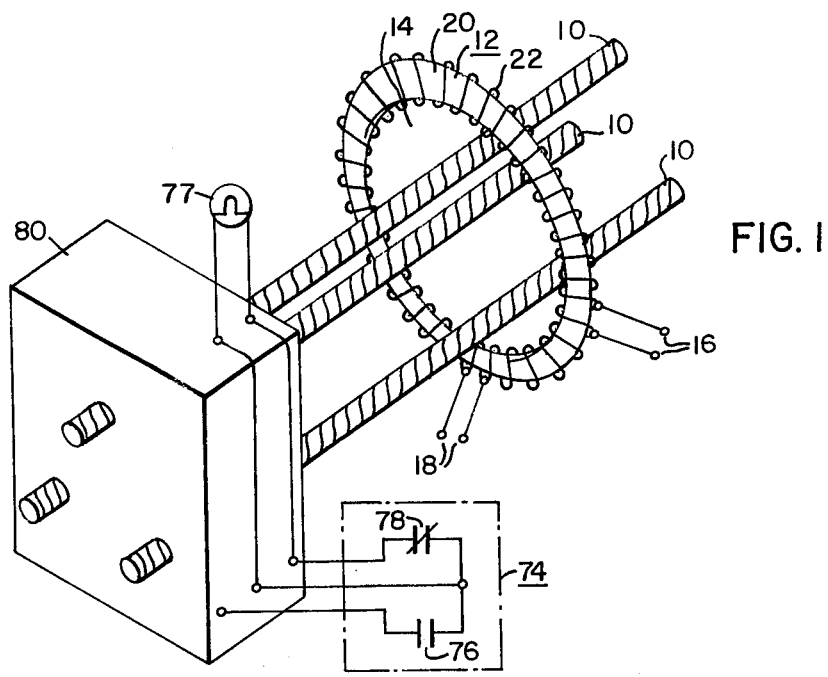
FIG. 1 is a schematic view of the electrical conductors extending through the current transformer and the indicating means.

FIG. 1 schematically illustrates a segment of a typical multi-conductor electrical distribution system. This segment may be from, for example, a transmission system to a manufacturing facility, from the entrance to the manufacturing facility to the various locations within the facility, or may be from distribution centers to individual pieces of equipment. The electricity is distributed through a plurality of electrical conductors 10. A closed loop core structure current transformer 12 having a window therebetween 14 surrounds the plurality of electrical conductors 10, and the conductors 10 extend through the window 14 of transformer 12. The transformer 12 has a power output 16 and a control output 18. The transformer 12 has a closed loop core 20; that is, the core 20 has its ends abutting to form an endless structure. Although shown as being circular, the core 20 may be of other configurations such as rectangular or triangular, so long as the core maintains it endless path structure. The purpose of the closed loop core structure is to render the fault indicating apparatus inoperative unless there exists a fault.

The plurality of electrical conductors 10 passing through the window 14 of the transformer 12 will be of different phases. As such, each conductor 10 causes a specific voltage vector having a definite magnitude and direction. If a fault does not exist, the vector sum of the voltage vectors from the electrical conductors 10 will cause zero flux to occur in the current transformer 12. This zero flux means that no current will flow within the windings 22 of the transformer 12. However, if a fault exists in one of the electrical conductors 10, such as might occur with a ground fault, the voltage vector for that conductor will change magnitude. This change in magnitude causes the equilibrium of the system passing through the window 14 to be unbalanced, which causes a net positive flux to occur in the transformer 12. This positive flux causes current to flow within the windings 22, and creates output at both the power output 16 and the control output 18.

Figure 2:
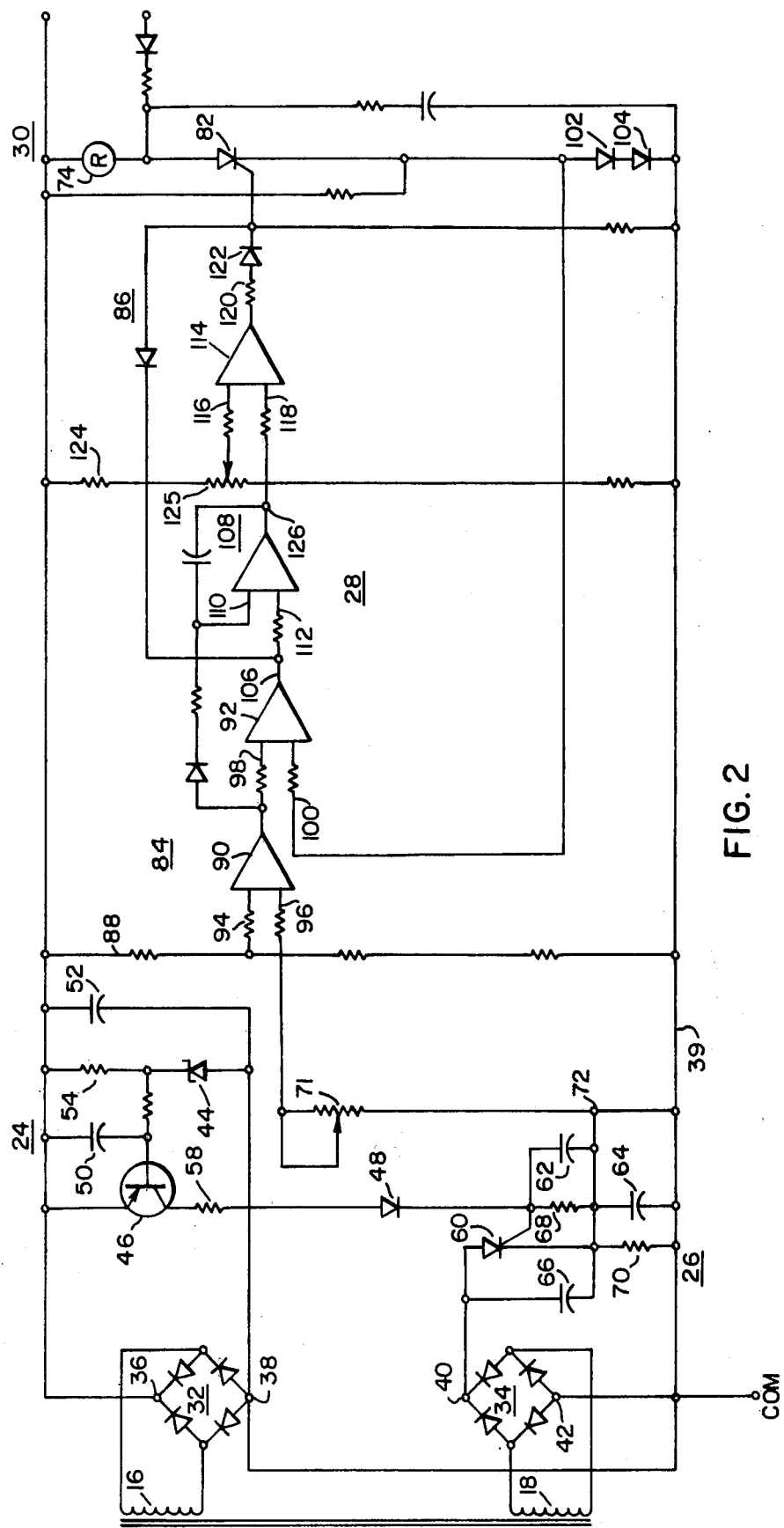
FIG. 2 is an electrical schematic of the apparatus of the invention.

Referring now to FIG. 2, the power output 16 is connected to starting means 24, and the control output 18 is connected to control signal translation means 26. The translation means 26 are connected to transmission means 28 which in turn are connected to fault indicating means 30. The starting means 24 are utilized for initiating operation of the translation means 26 and the transmission means 28 are utilized for transmitting the control signal from the translation means 26 to the fault indicating means 30.

The power output 16 is connected to input terminals of a full wave bridge rectifier 32 having output terminals 36 and 38. The output terminal 38 is connected to a common bus 39, while the output terminal 36 is connected to, among others, the starting means 24.

The starting means 24 comprises a voltage actuated device which is illustrated as being in the form of a Zener diode 44, a first switch 46 shown as a PNP transistor, a diode 48, capacitors 50 and 52, and a plurality of resistors 54, 56, and 58. The starting means 24 are connected through the diode 48 to the control signal translation means 26.

The control signal translation means 26 are comprised of a switching device 60, shown as being a thyristor, resistors 68 and 70, and capacitors 62, 64, and 66. The control signal translation means 26 are connected to an output terminal 40 of a full-wave bridge rectivier 34 which rectifies the voltage generated by the control output 18 of the current transformer 12. The control signal translation means 26 are connected to the transmission means 28 at the point indicated by the numeral 72. The purpose of the control signal translation means 26 is to translate the voltage generated in the control output 18 into a useful control signal at the point 72.

The operation and interaction of the starting means 24 and translation means 26 are as follows. Whenever a fault exists in one of the plurality of electrical conductors 10, current will flow in the windings 22, and generate voltage outputs at both the power output 16 and the control output 18. The power output voltage is rectified, and supplied to the starting means 24. When the voltage between the terminal 36 and common 39 is below the breakover voltage $V_z$ of the Zener diode 44, no substantial magnitude of current flows into the emitter of the transistor 46 or through the resistor 54. As the rectified current charges the capacitor 52, the voltage across the capacitor 52 increases until it approaches a magnitude equal to $Z_z$. When the voltage level across the capacitors 50 and 52 substantially reach $V_z$, the Zener diode 44 will breakover and conduct current through the resistor 54. The Zener diode 44 holds the base voltage constant while the emitter voltage continues to rise, causing the transistor 46 to conduct through its emitter and collector, resistor 58, and diode 48 to energize the gates of the thyristor 60. As illustrated, resistor 68 and capacitors 62, 64 and 66 have been connected so as to prevent the thyristor 60 from being energized by noise signals which may occur at the gate or by temperature related leakage current at the anode.

The energization of its gate causes the thyristor 60 to conduct and complete a path for the rectified current between the output terminal 40, through the anode and cathode of the thyristor 60, and resistor 70 to the common bus 39. This will produce a voltage across the resistor 70, and results in a control signal at the point designated 72. Thus, it can be seen that the starting means 24 will not initiate operation of the control signal translation means 26 unless the voltage level of the power output 18 exceeds a predetermined level, which level is substantially equal to the voltage drop required across the Zener diode 44 and the base-emitter junction of the transistor 46.

Also connected to the power output 16 are the fault indicating means 30. The fault indicating means 30 can comprise, for example, a relay 74 which is connected between the output terminal 36 of the rectifier 32 and common 39, with the relay having contacts 76, 78 (see FIG. 1) which change position and cause a lamp 77 to glow and/or initiate operation of circuit interrupting apparatus 80 which is coupled to the plurality of electrical conductors 10 and which prohibits the flow of electric current therein. Although illustrated separately, the circuit interrupter apparatus 80, the current transformer 12, and the components represented in the FIG. 2 schematic may be incorporated into one complete unit. In this manner, upon operation of fault indicating means 30, and more particularly the relay 74, the circuit interrupting apparatus 80 will stop the flow of current within the conductors 10 to prevent damage which may be caused by the fault condition.

Also included within the fault indicating means 30 are prevention means 82 such as the switch illustrated as being a thyristor, for preventing the operation of the fault indicating means 30. This normally open switch 82 is serially connected to the relay 74 such that until operation of the switch 82, no current will flow between the output terminal 36 and common 39 through the relay 74. The switch 82 is responsive to the control signal such that the switch 82 will allow operation of the relay 74 only when the control signal activates the switch 82. The transmission means 28 which transmits the control signal from the point 72 to the fault indicating means 30, is connected to the prevention means, or switch 82.

The transmission means 28 not only is utilized for transmitting the control signal from the translation means 26 to the indicating means 30, but also provides control over the initiation of the fault indicating means 30 so that the fault indicating means 30 will become operational only for those fault conditions which are above a predetermined magnitude and which exists for at least a minimum of time. This control is accomplished through control signal regulation means 84 and control signal timing means 86, which are included within the transmission means 28. The control signal regulation means 84 comprise the voltage dividers 71 and 88, and the two inverting comparators 90 and 92.

The inverting comparator 90 has as one input 94 a voltage supplied off of the voltage divider 88 which magnitude is substantially constant and which should be equal to the minimum control signal voltage which will appear at point 72. The other input 96 to the comparator is from the voltage divider 71. This signal corresponds to the control signal at the point 72 and which is diminished only if it is desired to prohibit initiation of the fault indicating means 30 until the fault exceeds some magnitude greater than that which will cause the switch 60 to conduct. The voltage divider 71 can be, for example, a variable potentiometer which can cause the initiating voltage to vary over a wide range. The inverting comparator 92 has as one input 98 the output from the first comparator 90. The second input 100 to the comparator 92 is some minimal voltage which can, for example, be equal to the voltage drop across the two diodes 102, 104 inserted serially in the fault prevention means 30.

The operation of the signal regulation means is as follows. The control signal at the point 72 flows through the voltage divider 71 and to the comparator 90. If the control signal magnitude is less than the magnitude of the voltage from the first input 94, the comparator will cause the signal to invert and cause a positive signal, or "high", to leave the comparator 90. This high is then greater than the voltage magnitude existing in the second input 100, which when inverted by the comparator 92 will cause no signal, or a "low" to appear at the output 106 of the comparator 92. This low means that the signal will be substantially zero, and no signal will be transmitted to the prevention means 82. In that instance, the prevention means 82 will not allow the operation of the relay 74.

However, if the magnitude at the input 96 is greater than the preset magnitude in the input 94, the comparator 90 will invert and cause a low to appear at the second input 98. At this low is less than the magnitude of the input 100, the comparator 92 will then invert and cause a high to appear at the output 106. This high is a net voltage which will cause the switch 82 to conduct after the timing means 86 time, which will then allow electric current to flow through the relay 74 which can initiate operation of the circuit interrupting means 80. Although the regulation means 84 are shown as comprising two inverting comparators 90, 92 the regulation means 84 can comprise one, non-inverting comparator (not shown). In this case, only those control signal inputs to the comparator exceeding the base signal input would cause the comparator to conduct and supply a signal to the prevention means 82. The use of two inverting comparators occurs so that a convenient input to the signal timing means 86 will be present, and to provide a reset capability for the signal timing means 86.

Figure 4:
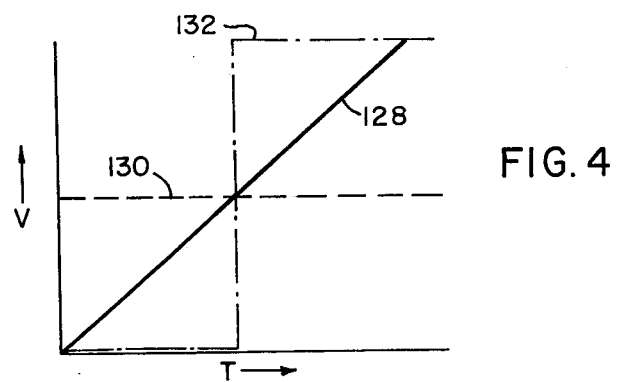
FIG. 4 is a graphic illustration of the control signal being supplied to the prevention means.

The control signal timing means 86 are comprised of an integrator 108 having inputs 110 and 112, a non-inverting comparator 114 having inputs 116 and 118, resistor 120, diode 122, and voltage divider 124. One input 110 of the integrator 108 is connected to the output of the first inverting comparator 90 and the other input 112 of the integrator 108 is connected to the output 106 of the comparator 92. The input 110 provides the base reference upon which comparison with the other input 112 is made. The input 110 also provides for a resetting capability for the integrator 108. If the control signal exceeds the minimum predetermined magnitude as determined by the regulation means 84, or as shown in the drawing, if the voltage input at 96 is greater than the input 94, the output 106 of the comparator 92 will be high or a positive voltage, which will cause a positive voltage input at the integrator 108 and remove the reset input 110. This positive voltage will be greater than the voltage at the input 110, and the output 126 of the integrator 108 will rise continuously. The output of the integrator 108 is shown as the solid line 128 in FIG. 4. This voltage output 126 is also the voltage at the input 118 to the non-inverting comparator 114. The other input 116 to the comparator 114 is from the voltage divider 124, and more particularly the potentiometer 125. This voltage is variable, and is used to determine the amount of time delay present before activation of the prevention means 82. As shown in FIG. 4, the voltage from the potentiometer 125 is illustrated as the dashed line 130. This voltage 130 can be varied vertically as illustrated in the graph to determine the amount of time delay. The comparator 114 will cause an output voltage to accur across the resistor 120 and diode 122 only when the voltage input of the input 118 is greater than the voltage present at input 116. Graphically, this is shown in FIG. 4 by the interception of the lines 128 and 130. The dashed-dotted lines 132 illustrates the voltage across the resistor 120 as it varies with time. As can be seen, until the output from the integrator 108 exceeds the voltage from the voltage divider 124, the voltage across the resistor 120 is zero, and increases rapidly once the voltage 128 exceeds that of the voltage divider 130. The voltage 132 across the resistor 120 then activates the switch 82 so that the relay 74 will operate and cause the circuit interrupting apparatus 80 to stop the flow of current in the electrical conductors 10.

The circuit described in FIG. 2 is useful wherever it is desired to provide an indication of the existence of a fault. However, in some applications, it may be desirable to interconnect two or more of these apparata in such a manner that the existence of a fault in one segment of the distribution system will not cause the interruption of electrical power in other segments of the system. This may be accomplished, for example, by means of the interlock circuitry illustrated interconnected with the basic circuit in FIG. 3. The interlock circuitry provides that the first fault indicating apparatus to sense the existence of a fault will indicate instantaneously, without any time delay present, while at the same time sending a signal to the interconnected indicating apparatus to cause such interconnected apparatus to time delay according to the predetermined setting of its signal timing delay means 86. Additionally, the interlock circuitry provides for rendering the fault indicating means of a different apparatus inoperable even though such apparatus detects the existence of a fault.

The interlock circuitry is comprised of three distinct sections: an output segment 134, an instantaneous trip segment 136, and a bypass segment 138. The output segment 134 comprises a non-inverting comparator 140 which has as one input 142 a voltage equal to the signal being supplied to the initial comparator 90 of the basic circuit. The other input 144 of the comparator 140 is connected to the voltage divider 88 and supplies a voltage less than the base reference voltage being supplied, at input 94, to the first integrator 90 of the basic circuit. The voltage input 144 to the comparator 140 is less than the voltage input 94 to the first comparator 90, so that at output 146 a signal will occur at lower voltages of the control signal than that necessary to initiate operation of the prevention means 82 of the basic circuitry. This provides for an earlier warning of the existence of a fault than would otherwise occur.

The instantaneous trip section 136 is comprised of the inverting comparator 148, the non-inverting comparator 150, resistors 152, 154, 156, 158, 160 and 162, and diode 164 and 166. The non-inverting comparator 150 has as one input 160 a voltage equal to the output 126 of the integrator 108. The other input 158 to the comparator 150 is a nominal voltage such as that supplied at the input 100 to the second inverting comparator 92 in the basic circuit. The inverting comparator 148 has as one input 156 a similar nominal voltage and the other input 152 is interconnected with the output 146 of either itself or with a similar fault indicating apparatus. The resistor 154 is connected between the input 152 to the comparator 148 and common 39. The output 168 of comparator 148 is connected, with reverse bias diode 164, to the output 170 of comparator 150. The output 170 of comparator 150 is also connected to the prevention means 82 through diode 166.

The operation of the instantaneous trip circuit 136 is as follows. If there is no signal applied to the resistor 152, the nominal voltage at the input 156 to comparator 148 will show a low, which will be inverted by the comparator 148, resulting in a high at the output 168. This high will reverse bias the diode 164, and prevent current flow through the comparator 148 and resistor 154 to common 39. At the same time, the input 160 to the comparator 150 will be greater than the nominal input 158 which will cause a positive signal output 170 which will cause a signal to occur at the switch 82. This signal at the switch 82 will occur prior to the time that a signal would occur at the switch 82 from the basic circuit, since the basic circuit has time delay means 86, and hence the prevention means 82 will become operational instantaneously upon the existence of a fault condition exceeding the prior, predetermined magnitude. If, however, a signal is applied to the resistor 152, the resulting input to the comparator 148 will be high, which will be inverted and cause a low at the output 168. As such, the diode 164 will not be reverse biased, and the signal present at the output 170 will travel, instead of to the switch 82, to the diode 164, the comparator 148, and to common 39. This will enable the basic circuit to control the operation of the switch 82 and provide for the predetermined delay time.

Also included in the interlock circuitry is a no-trip circuit 138 for preventing initiation of operation of the switch 82, thereby preventing the operation of the relay 74. The no-trip circuit 138 is comprised of the inverting comparator 172 having inputs 174 and 176, diode 178, and resistive arm 180. The input 176 to the comparator 172 is connected to the nominal voltage caused by diodes 102, 104, and the other input 174 to the comparator 172 is interconnected, for example, with a similar type apparatus. If no signal is present at input 174, the inputs 174 and 176 to the comparator 172 will show a low, which will be inverted by the comparator 172, back biasing the diode 180 and preventing the bypassing of the signal from the prevention means 82. However, if a signal is received at the input 174, the inputs 174, 176 will produce a high, which will be inverted by the comparator 172. This will produce a low at the output 182, and any current which would otherwise flow to the prevention means 82 will instead bypass the prevention means 82 and flow through the diode 178, the comparator 172, and the resistive arm 180 to common 39. In this instance, no signal will be applied to the switch 82, which will remain inoperative and continuously prevent the operation of the relay 74.

Figure 5:
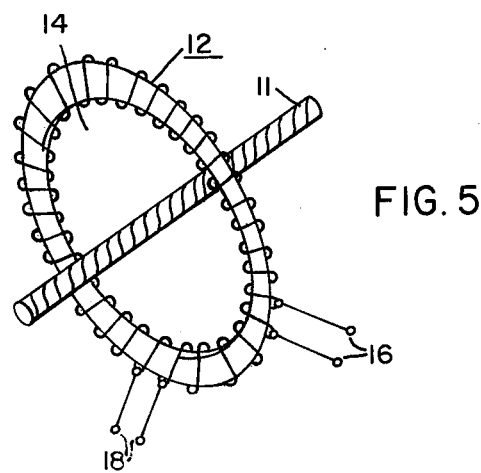
FIG. 5 is a modification of the schematic view of FIG. 1.
Figure 3:
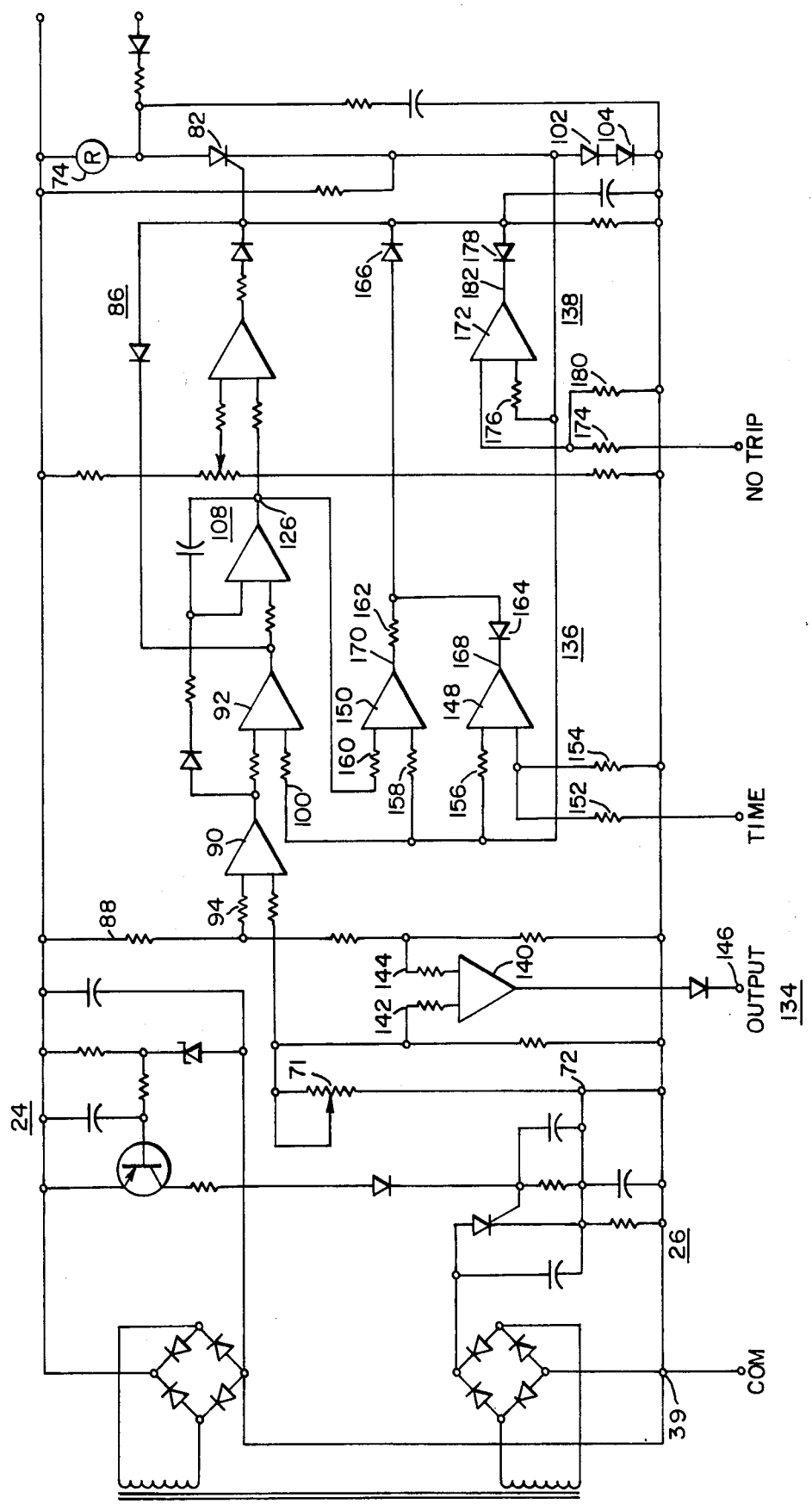
FIG. 3 is an electrical schematic of the invention of FIG. 2 which includes an interlock circuit for connection with similar apparatus.

Another use of the circuit shown in FIGS. 2 or 3 is illustrated in FIG. 5. In this modification, the transformer 12 has a window 14 through which passes a single conductor 11. This conductor may, for example, be a ground from a main transformer or may be a single phase of a multiphase, multi-conductor system. In this use, the circuitry performs a current monitoring function, indicating when the current in the conductor 11 exceeds a predetermined magnitude for a minimum duration.

The conductor 11 will cause a current flow within the windings 22, resulting in an output at both the power output 16 and the control output 18. However, the current will not cause the operation of indicating means 74 unless the control signal exceeds a predetermined magnitude, as determined by the regulation means 84, for a minimum duration, as determined by the timing means 86. The elements shown in FIGS. 2 or 3 operate as heretofore described and the indicating means may include a lamp 77 or circuit interrupting apparatus 80, if desired.

Thus, it can be seen that this invention provides an apparatus for indicating the existence of a fault in at least one of a plurality of electrical conductors which is operational only during the existence of the fault condition, and which can also function as a current monitoring apparatus.

I claim as my invention:

1. Apparatus for indicating the existence of a fault in a multi-conductor electrical distribution system wherein the fault may occur in any of a plurality of adjacent electric conductors comprising:
   a closed loop core structure current transformer having a power output winding and a control output winding, providing a power output and a central output respectively, said closed loop core forming a window therebetween, said plurality of electric conductors extending throught said window and causing a current flow in said transformer only when a fault exists in at least one of said conductors;
   control signal translation means connected to said transformer control output for translating said transformer control output into a control signal;
   starting means connected to said power output and said control signal translation means for initiating operation of said control signal translation means, said starting means being driven by said power output and initiating operation of said control signal translation means only when said power output reaches a predetermined power magnitude;
   means for indicating the existence of a fault connected to and driven by said power output, said fault indicating means including means for preventing the operation of said fault indicating means, said prevention means being responsive to said control signal such that said prevention means allow the operation of said fault indicating means only when said control signal activates said prevention means; and
   transmission means connected to said control signal translation means and said prevention means for transmitting said control signal from said control signal translation means to said prevention means.

2. The apparatus according to claim 1 wherein said transmission means comprise control signal regulation means for controlling the transmission of said control signal, said signal regulation means prohibiting the transmission of said control signal to said prevention means until said control signal magnitude exceeds a predetermined level.

3. The apparatus according to claim 2 wherein said control signal regulation means are variable, whereby said predetermined level is variable.

4. The apparatus according to claim 1 wherein said transmission means comprise control signal timing means for controlling the transmission of said control signal, said signal timing means prohibiting the transmission of said control signal to said prevention means until a predetermined period of time has elapsed.

5. The apparatus according to claim 4 wherein said control signal timing means are variable, whereby said predetermined period is variable.

6. The apparatus according to claim 4 including instantaneous trip means for bypassing operation of said control signal timing means and causing instantaneous activation of said prevention means.

7. The apparatus according to claim 1 wherein said fault indicating means comprise:
   a relay connected to and driven by said power output and having a contact; and
   circuit interrupting apparatus coupled to said plurality of electric conductors and to said relay contact, said relay contact, upon operation of said relay, changing position and activating said circuit interrupting apparatus to prohibit the flow of electric current in said electric conductors.

8. The apparatus according to claim 1 wherein said fault indicating means comprise an electric lamp connected to and driven by said power output.

9. The apparatus according to claim 1 wherein said prevention means comprise a switch serially connected with said fault indicating means, said switch being normally non-conducting and conducting only upon activation by said control signal.

10. The apparatus according to claim 9 wherein said switch is a thyristor.

11. The apparatus according to claim 1 including bypass means connected to said transmission means, said bypass means preventing said control signal from initiating operation of said prevention means.

12. Apparatus for monitoring the current in an electric conductor comprising:
   a closed loop core structure current transformer having a power output winding and a control output winding, providing a power output and control output respectively, said closed loop core forming a window therebetween, said electric conductor extending through said window;
   control signal translation means connected to said transformer control output for translating said transformer control output into a control signal, said control signal being proportional to the current in said electric conductor;
   starting means connected to said power output and said control signal translation means for inititating operation of said control signal translation means, said starting means being driven by said power output and initiating operation of said control signal translation means only when said power output reaches a predetermined power magnitude;
   means for indicating the presence of current in said electric conductor connected to and driven by said power output, said indicating means including means for preventing the operation of said indicating means, said prevention means being responsive to said control signal such that said prevention means allow the operation of said indicating means only when said control signal activates said prevention means; and
   transmission means connected to said control signal translation means and said prevention means for transmitting said control signal from said control signal translation means to said prevention means, said transmission means comprising control signal regulation means for controlling the transmission of said control signal, said signal regulation means prohibiting the transmission of said control signal to said prevention means until said control signal magnitude exceeds a predetermined level, and control signal timing means for controlling the transmission of said control signal, said signal timing means prohibiting the transmission of said control signal to said prevention means until a predetermined period of time has elapsed, whereby said indicatng means indicate the presence of current in said electric conductor only when said current exceeds a predetermined magnitude for a predetermined period of time.

13. The apparatus according to claim 12 wherein said control signal regulation means are variable, whereby said predetermined level is variable.

14. The apparatus according to claim 12 wherein said control signal timing means are variable, whereby said predetermined period is variable.

15. The apparatus according to claim 12 wherein said indicating means comprise an electric lamp connected to and driven by said power output.

16. The apparatus according to claim 12 wherein said prevention means comprise a switch serially connected with said fault indicating means, said switch being normally non-conducting and conducting only upon activation by said control signal.

17. The apparatus according to claim 16 wherein said switch is a thyristor.

* * * * *